United States Patent
Pronin et al.

(10) Patent No.: US 12,498,409 B2
(45) Date of Patent: Dec. 16, 2025

(54) CORRECTING FOR LOAD RESISTANCE WHEN MAKING I-V MEASUREMENTS WITH CONSTANT DRAIN VOLTAGE ON POWER MOSFETS

(71) Applicant: Keithley Instruments, LLC, Solon, OH (US)

(72) Inventors: Alexander N. Pronin, Twinsburg, OH (US); Mary Anne Tupta, Twinsburg, OH (US); Andrew Alan Shetler, Uniontown, OH (US)

(73) Assignee: Keithley Instruments, LLC, Solon, OH (US)

( * ) Notice: Subject to any disclaimer, the term of this patent is extended or adjusted under 35 U.S.C. 154(b) by 123 days.

(21) Appl. No.: 18/357,941

(22) Filed: Jul. 24, 2023

(65) Prior Publication Data

US 2024/0036101 A1 Feb. 1, 2024

Related U.S. Application Data

(60) Provisional application No. 63/392,845, filed on Jul. 27, 2022.

(51) Int. Cl.
*G01R 31/26* (2020.01)
(52) U.S. Cl.
CPC ................ *G01R 31/2621* (2013.01)
(58) Field of Classification Search
CPC .................................................. G01R 31/2621
See application file for complete search history.

(56) References Cited

U.S. PATENT DOCUMENTS

| | | |
|---|---|---|
| 6,314,390 B1 | 11/2001 | Bittner et al. |
| 7,280,929 B1 | 10/2007 | Zhao |
| 8,400,179 B1 | 3/2013 | Hulbert et al. |
| 9,984,190 B1 | 5/2018 | Aurich et al. |
| 10,962,585 B2 | 3/2021 | Pronin et al. |
| 11,175,332 B2 | 11/2021 | Nakamura et al. |
| 2003/0113946 A1* | 6/2003 | Yamaguchi ............ H01L 22/14 438/17 |

(Continued)

FOREIGN PATENT DOCUMENTS

IN 201831041698 5/2020

*Primary Examiner* — Judy Nguyen
*Assistant Examiner* — Adam S Clarke
(74) *Attorney, Agent, or Firm* — Miller Nash LLP; Krista Y. Chan (57) ABSTRACT

A test and measurement instrument, includes a user interface, one or more probes configured to connect to a device under test comprising a MOSFET, and one or more processors configured to execute code that causes the one or more processors to: set a target voltage to be measured across the MOSFET, apply a force voltage to the MOSFET, measure a drain current and a drain voltage of the MOSFET with the one or more probes, determine if a difference between the measured drain voltage and the target voltage meets a threshold, when the difference does not meet the threshold, use the measured drain voltage, the measured drain current, and a load resistance to determine a new force voltage value to compensate for the load resistance, set the force voltage to the new force voltage value, and repeat the apply, measure and determine steps as needed.

20 Claims, 8 Drawing Sheets

(56) References Cited

U.S. PATENT DOCUMENTS

| | | | |
|---|---|---|---|
| 2009/0079446 A1* | 3/2009 | Chatterjee | G01R 31/2621 324/719 |
| 2014/0139206 A1* | 5/2014 | Hirose | G01R 1/06766 324/132 |
| 2019/0346501 A1* | 11/2019 | Pronin | G01R 31/2601 |

* cited by examiner

CORRECTING FOR LOAD RESISTANCE WHEN MAKING I-V MEASUREMENTS WITH CONSTANT DRAIN VOLTAGE ON POWER MOSFETS

CROSS-REFERENCE TO RELATED APPLICATIONS

This disclosure claims benefit of U.S. Provisional Application No. 63/392,845, titled "CORRECTING FOR LOAD RESISTANCE WHEN MAKING I-V MEASUREMENTS WITH CONSTANT DRAIN VOLTAGE ON POWER MOSFETS," filed on Jul. 27, 2022, the disclosure of which is incorporated herein by reference in its entirety.

TECHNICAL FIELD

This disclosure relates to test and measurement instruments, and more particularly to devices and methods for making current-voltage (I-V) measurements.

BACKGROUND

Current-Voltage (I-V) measurements on power MOSFETs often involve measuring high drain current, such as greater than 10A. When measuring this drain current, even small load resistances in the test circuit can cause large unwanted voltage drops causing a decay in the forced drain voltage. This causes the measured drain current to be less than expected causing incorrect results.

DETAILED DESCRIPTION

The embodiments herein involve methods to compensate for reduced drain voltage due to voltage drops across load resistance. The embodiments use previous values of the measured drain voltage and the measured drain current to determine an expected drain current. The methods may operate iteratively until a measured drain voltage matches the target voltage across the device.

Figure 1:
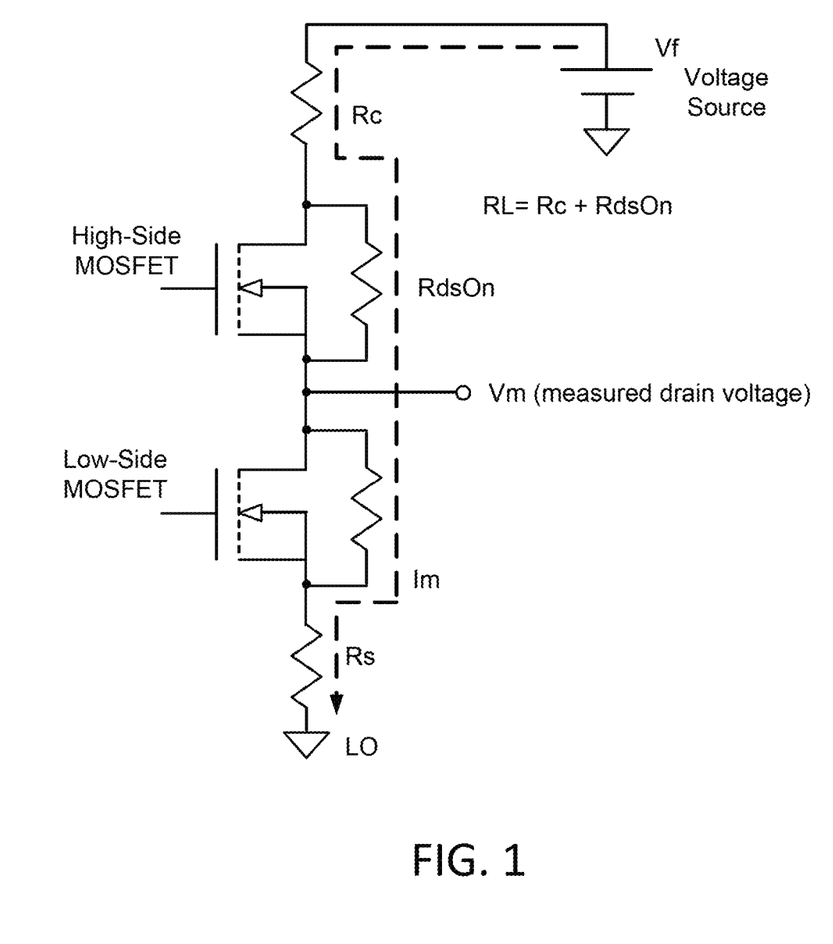
FIG. 1 shows a power module circuit showing load resistance.

The below discussion uses several parameters defined here with reference to FIG. 1. In the configuration shown in FIG. 1, the device being measured, i.e. the device under test (DUT), is the bottom transistor, labeled "Low-Side MOSFET." Vd is the drain voltage of the device and Vt is the target drain voltage of the device. Id is the drain current when the drain voltage is Vt. Vf is the force voltage, which the methods of the embodiments adjust as needed to compensate for the voltage drop across the load resistance. Vm is the measured drain voltage, and Im is the measured drain current. Various resistances make up the load resistance. These include RdsOn a constant equal to the on drain-source resistance of top MOSFET, Rc represents the contact, lead, and other circuit resistances, and Rs represents the current sense resistor. However, the sense resistor contributes relatively little to the load resistance, so the effective resistance is RL=Rc+RdsOn.

The voltage source forced the forced voltage, Vf. The voltage measured across the device is Vm. Ideally, after completion of the procedure, the measured voltage across the device should be equal to the target drain voltage, or Vm=Vt. At this condition, the measured drain current (Im) is returned as Id. The measured drain current, Im, flows from Vf to LO. Unwanted voltage drops occur across the load resistance, RL, which equals (Rc+Rs+RdsOn), which reduces the measured drain voltage Vm as well as the measured drain current Im.

Two similar methods have been developed to compensate for the unwanted load resistances and subsequent reduced drain current and drain voltage measurements: the Linear Model Method and the Expected Value Method.

Figure 2:
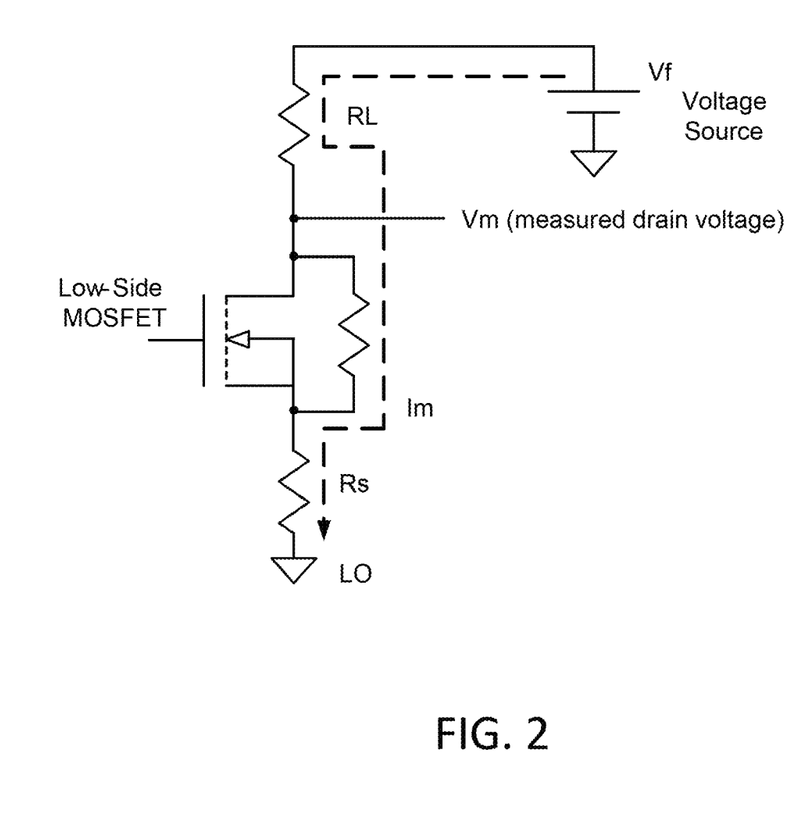
FIG. 2 show a power module circuit used with embodiments of compensating for load resistance.

In the Linear Model Method, the load and DUT resistances are assumed to be constant which is usually the case in the linear region of a MOSFET Id-Vd curve. In this case, RdsOn is constant. Therefore, the power MOSFET circuit can now be modeled as shown in FIG. 2.

Figure 3:
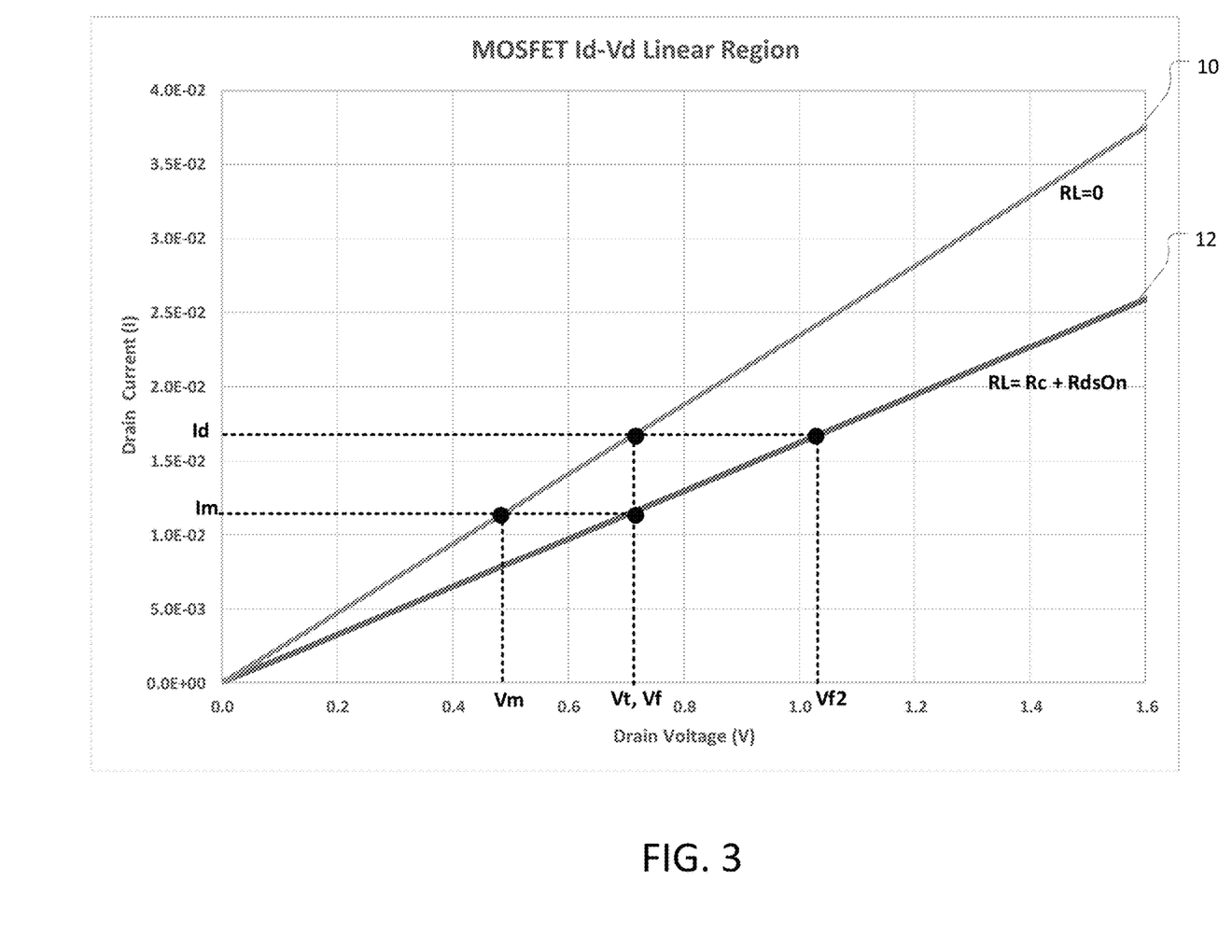
FIG. 3 shows a graph of Id-Vd curves with and without load resistance for an embodiment with linear characteristics.

FIG. 3 shows the Id-Vd curves of a linear circuit with load resistance, RL, at line 12 and without load resistance at line 10. When Vf is forced, the measured voltage Vm and current Im will be smaller because of the voltage drops across the load resistances. Vf2 is the amount of forced voltage required to compensate for the load resistance and to provide the required target voltage Vt at the drain. The point (Vm, Im) shows the measured current and voltage reduced due to RL. The point (Vt, Id) shows the drain current and voltage without voltage drop due to RL. (Vf2, Id) shows the point where the voltage is increased to compensate for RL and where the measured drain current Im equals the compensated drain current, Id.

From the forced voltage and measured current and voltage, the load resistance (RL) can be calculated:

$$RL = \frac{(Vf - Vm)}{Im}$$

Vf2 is the force voltage to use for load compensation in the Linear Method Model. Vf2 can be determined from the load resistance RL, the compensated drain current Id, and the target drain voltage Vt as follows:

$$Vf2 = Vt + (RL * Id)$$

The compensated drain current Id, can also be determined from the graph where the drain currents are proportional to the drain voltages such that:

$$\frac{Id}{Im} = \frac{Vf}{Vm}$$

Therefore, $$Id = Im * \frac{Vf}{Vm}$$

After the first set of drain current Im1 and drain voltage Vm1 measurements, then the force voltage used for compensation becomes:

$$Vf2 = Vt + RL * \left(Imi * \frac{Vf}{Vmi}\right).$$

From the graph and the derived equations, one embodiment of a method for correcting or compensating for load resistance is:
1. Force Vt and measure Im and Vm. Vt is the equivalent to Vf for the first iteration.
2. Compare Vt and Vm. If |Vt−Vm|>acceptable error, then go to step 3. If the difference is less than the acceptable error the process can stop because sufficient load compensation has been achieved
3. Calculate RL using the equation:

$$RL = \frac{(Vf - Vm)}{Im}$$

4. Calculate the compensated drain current:

$$Id = Im * \frac{Vf}{Vm}$$

5. Calculate the next force voltage value to force using the equation:

$Vf2 = Vt + (RL * Id)$

6. Repeat at Step 1 with Vf2 as the next value for the force voltage.

Figure 4:
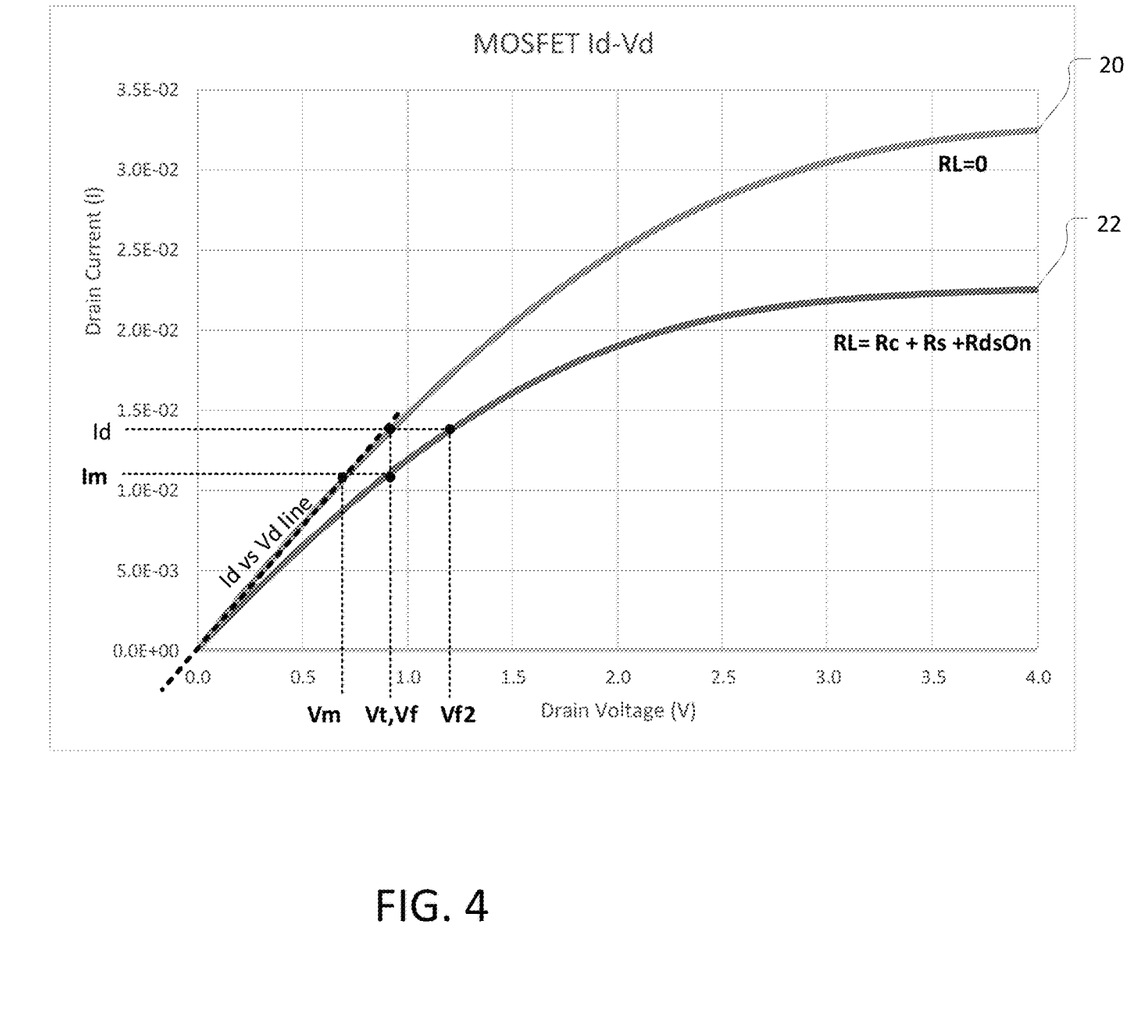
FIG. 4 shows a graph of Id-Vd curves showing the effects of load resistance for an embodiment with non-linear characteristics.

In non-linear devices the assumptions in the linear approach are not necessarily valid. For these types of devices, The Expected Value Method uses an iterative approach to predict the accurate drain current for the target drain voltage, Vt. This method works well for non-linear devices. FIG. 4 graphically shows the effects of the load resistance on the drain current and drain voltage. The top curve 20 shows Id-Vd dependency with no load resistance (RL=0), and the bottom curve 22 shows the reduced drain current because of RL.

For each step in the iterative approach, the current Im and voltage Vm are measured and then the load resistance (RL), expected current Iexp, the required forced voltage Vf, and the difference between the target voltage and the measured voltage |Vt−Vm| are calculated. The calculations initially rely upon the first two measurements, and after that to the previous measurement to the most recent measurement, referred to here as the 'instant' measurement. These calculations are as follows:

$$RL: RL = \frac{(Vf - Vm)}{Im}$$

$Iexp: Iexp = (a \times Vf) + b$ where, a is the slope of the line and is calculated from the first two previous measurements for each iteration step as:

$$a = \frac{Im1 - Im2}{Vm1 - Vm2}$$

b is the y-intercept and is calculated as:
b=Im1−aVf1; and $Vf = Vt + (Iexp \times RL)$ From the graph and the derived equations, another embodiment of a method for correcting or compensating for load resistance, once these values are calculated, the procedure below can be repeated to find Id and the force voltage required to correct for RL in non-linear devices.
1. Set a target for force voltage, Vt.
2. Measure the drain voltage Vm and drain current Im.
3. Calculate RL, Iexp, Vf, and
4. Compare the |Vt−Vm| to a preset accuracy specification to determine if another iteration is required.
5. Repeat if is not reached at Step 1 with calculated Vf.
6. Return Id.

Figure 5:
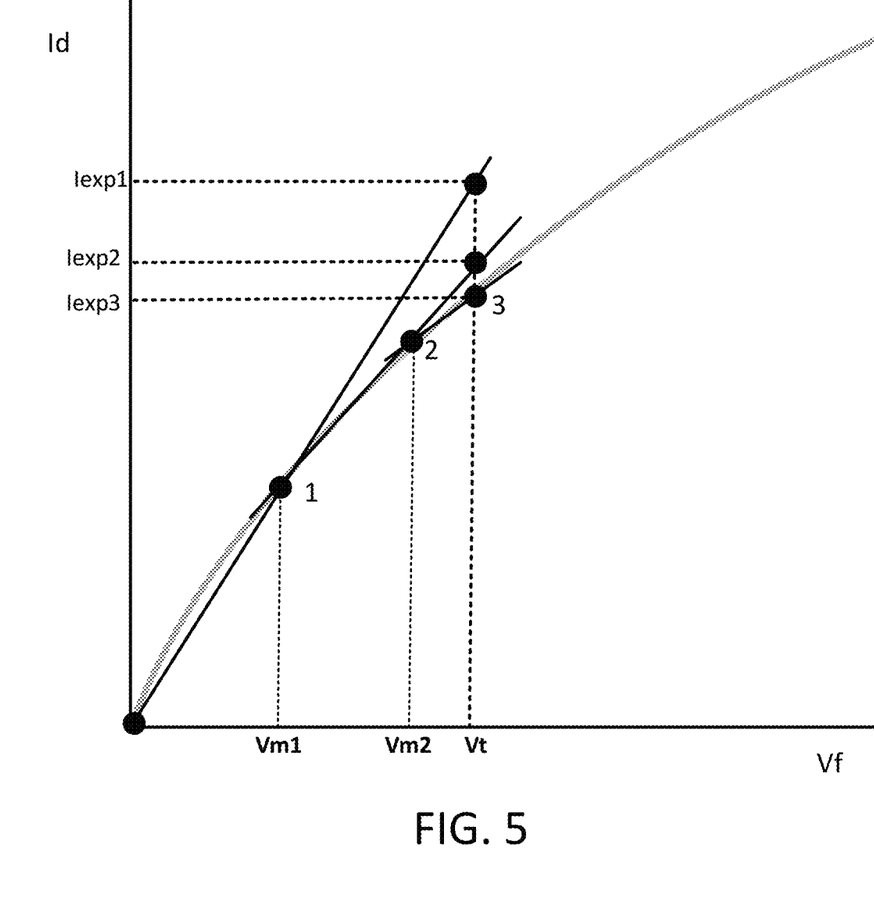
FIG. 5 shows a graph of Id-Vd curves for an iterative embodiment.

FIG. 5 illustrates the converging of the expected current on the actual Id curve of the DUT. In this case, three iterations of the produced were required for the target voltage to be reached. In the final iteration the measured values are, Vm3=Vt and Im3=Id.

The three steps taken for this example are listed in Table 1.

| Step | Force V | Measure | Calculate | Compare |
|---|---|---|---|---|
| 1 | Vt | Vm1, Im1 | RL1, Iexp1, Vf1, |Vt − Vm1| | |Vt − Vm1| < accuracy |
| 2 | Vf1 | Vm2, Im2 | RL2, Iexp2, Vf2, |Vt − Vm2| | |Vt − Vm2| < accuracy |
| 3 | Vf2 | Vm3, Im3 | RL3, Iexp3, Vf3, |Vt − Vm3| | |Vt − Vm3| < accuracy |

Figure 6:
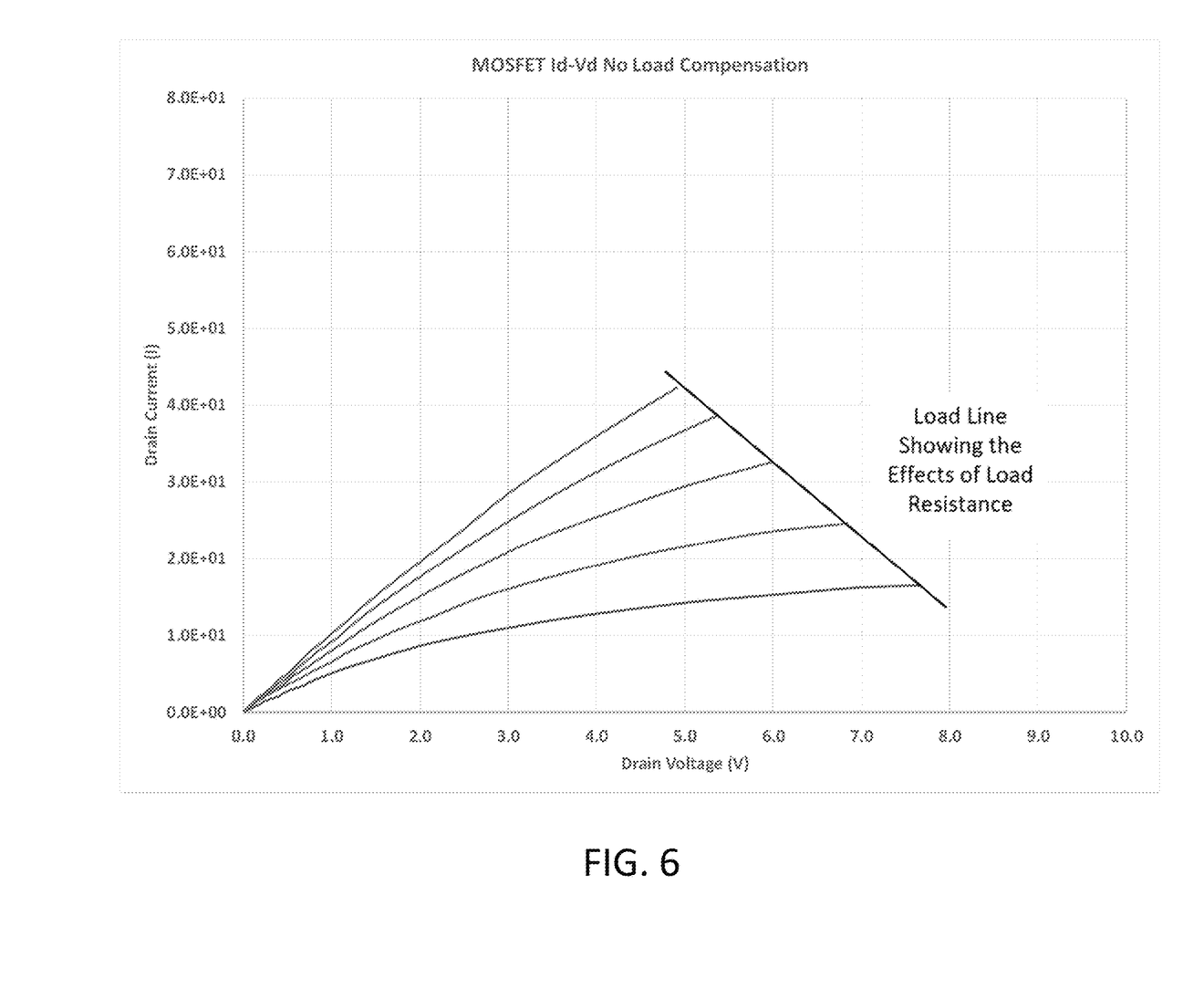
FIG. 6 shows a graph of Id-Vd curves generated without load correction.

An actual example illustrates the benefits of using the Expected Value Method. FIG. 6 shows the effects of load resistance when measuring the drain current vs drain voltage (output characteristics) of a power MOSFET. In this example, target drain voltage was set to sweep 0 to 10V at each gate voltage step. However, because of the load resistance, the maximum drain voltage and drain current was reduced. The slope of the load line shown in the graph is 1/RL.

Figure 7:
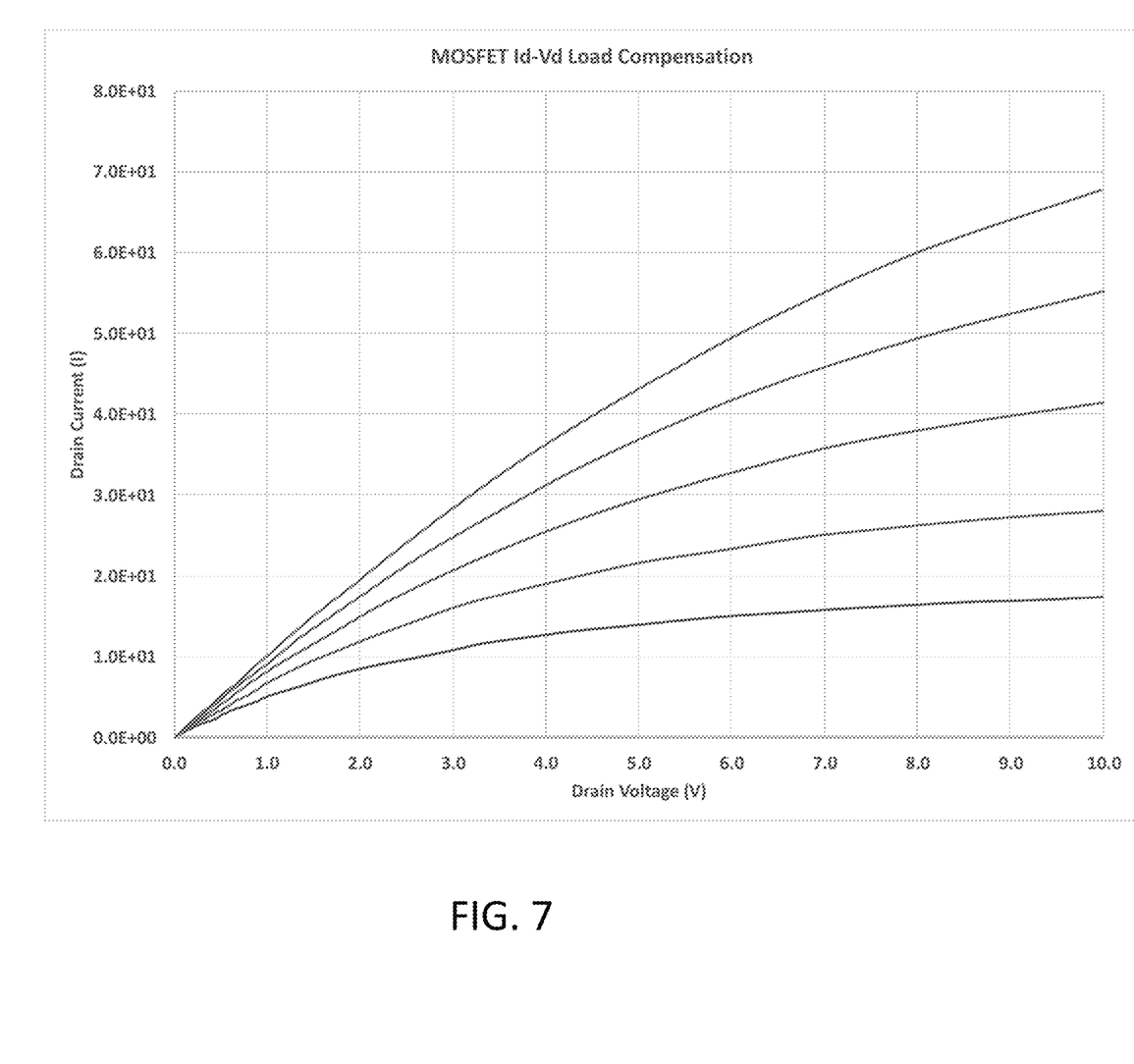
FIG. 7 shows a graph of Id-Vd curves generated with load correction in an embodiment with non-linear characteristics.

FIG. 7 shows the effects of using the Expected Value Method when generating the output characteristics on the same power MOSFET. Notice in this case, the maximum targeted drain voltage of 10V was measured at each gate voltage step.

In summary the two methods use similar methods to use previously measured drain current and voltage to determine a new value for the force voltage to compensate for the load resistance until the measured drain voltage matches the target voltage. Differences between the two methods are based on how Id is determined. The Linear Model Method uses a ratio technique and the Expected Value Method uses multiple measurements in an iterative approach.

Figure 8:
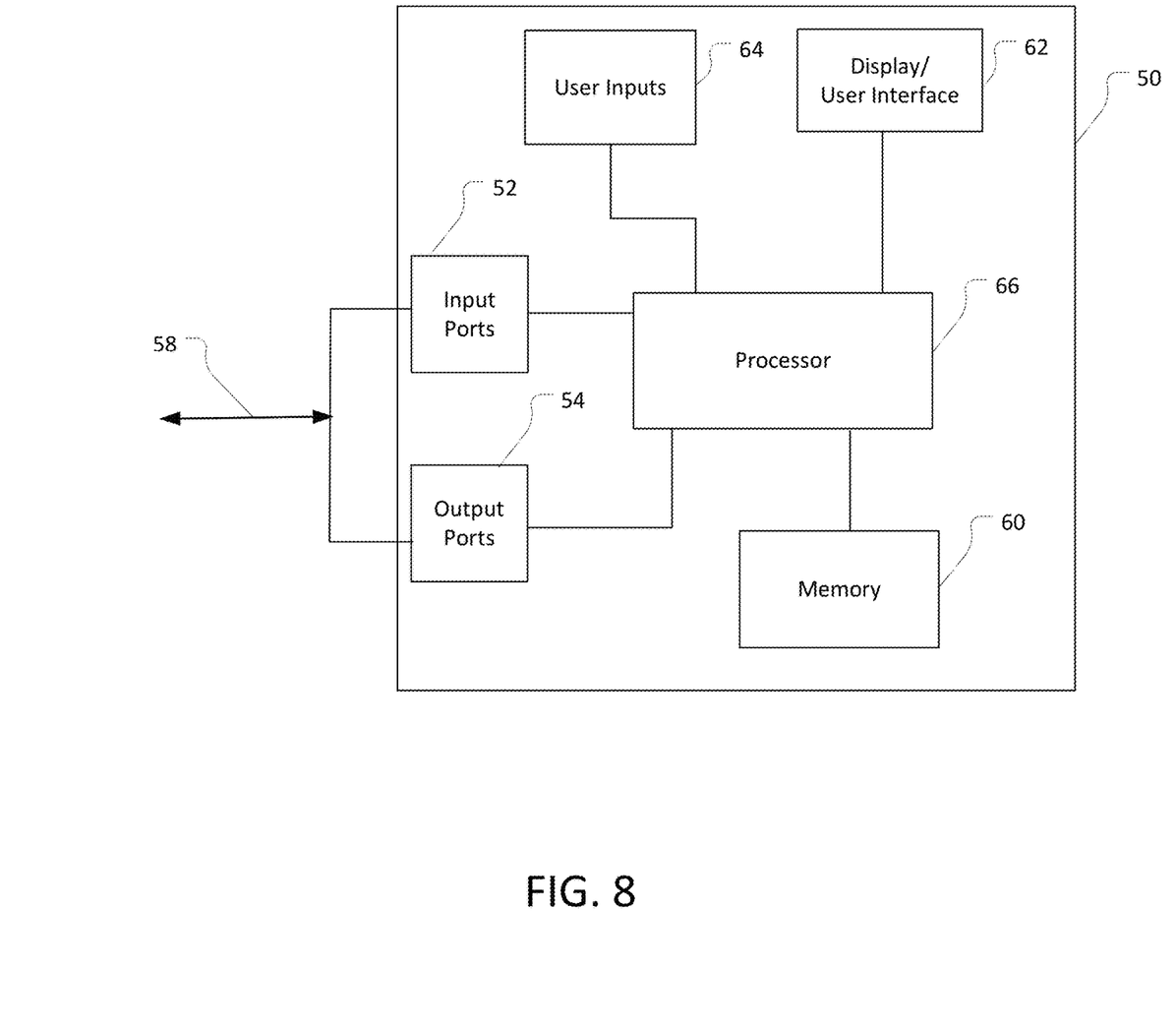
FIG. 8 shows a diagram of a test and measurement instrument.

One should note that the methods of the embodiments may be performed as instructions or code executed by the processing capabilities of a test and measurement instrument. FIG. 8 shows an embodiment of an instrument. The term "test and measurement instrument" applies to any type of equipment used in the testing and measuring of DUTs, including oscilloscopes, source measurement units, multimeters, etc.

FIG. 8 shows a block diagram of an example test and measurement instrument 50 for implementing the methods of the embodiments. The test and measurement instrument 50 includes one or more input ports 52, which may receive signals from a DUT through probe or connection 58, and one or more output ports 54 which may be any electrical signaling medium. Ports 52, 54 may include receivers, transmitters, and/or transceivers. Input ports 52 are used to receive signals from an attached device, such as a DUT, a MOSFET, Power MOSFET, or other objects being tested. Output ports 54 are used to carry generated signals out of the instrument 300 to be applied to a device or a DUT. Examples of output signals include waveforms as well as constant currents and voltages, and may be applied to the device or devices being tested. Each input port 52 may comprise a channel of the test and measurement instrument 50. The input ports 52 are coupled with one or more processors 66 to process the signals and/or waveforms received at the ports 52 from one or more devices under test. Output ports 54 may be coupled to the processor 66, or other components within the instrument 50 that generate the appropriate output signals. Although FIG. 8 only shows one processor 56 for ease of illustration, as will be understood by one skilled in the art, multiple processors 66 of varying types may be used in combination, rather than a single processor 56.

The input ports 52 can also connect to a measurement unit within the test instrument 50, not depicted here for ease of illustration. Such a measurement unit can include any component capable of measuring aspects, such as voltage, amperage, amplitude, etc., of a signal received via the input ports 52. The output ports 54 can also be connected to various components of the instrument 50, such as voltage sources, current sources, or waveform generators, which are not depicted for ease of illustration. The test and measurement instrument 50 may include additional hardware and/or processors, such as conditioning circuits, an analog to digital converter, and/or other circuitry to convert a received signal to a waveform for further analysis. The resulting waveform can then be stored in a memory 60, as well as displayed on a display 62.

The one or more processors 56 may be configured to execute instructions from memory and may perform any methods and/or associated steps indicated by such instructions, such as displaying values measured to a coupled device according to embodiments of the disclosure. Memory 60 may be implemented as processor cache, random access memory (RAM), read only memory (ROM), solid state memory, hard disk drive(s), or any other memory type. Memory 310 acts as a medium for storing data, computer program products, and other instructions.

User inputs received from the user interface are coupled to the processor 56. User interface 62 may include a keyboard, mouse, trackball, touchscreen, and/or any other controls employable by a user to with a User Interface on the display 62. While the components of test instrument 50 are depicted as being integrated within test and measurement instrument 50, it will be appreciated by a person of ordinary skill in the art that any of these components can be external to test instrument 50 and can be coupled to test instrument 50 in any conventional manner.

In this manner, embodiments for compensating for load line resistance is provided. Previous load line compensation methods typically require many more iterations before the proper compensation is found. The embodiments here take less pulse/measure iterations to compensate for the load effect. The calculations of the embodiments rely on information from previous measurements, allowing for dynamic calculations of the load line resistance at each step.

What makes this technique unique and efficient, we build a dynamic device model and use the data from previous iterations to speed up the next iteration.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Although specific aspects of the disclosure have been illustrated and described for purposes of illustration, it will be understood that various modifications may be made without departing from the spirit and scope of the disclosure. Accordingly, the disclosure should not be limited except as by the appended claims.

EXAMPLES

Illustrative examples of the disclosed technologies are provided below. An embodiment of the technologies may include one or more, and any combination of, the examples described below.

Example 1 is a test and measurement instrument, comprising: a user interface; one or more probes configured to connect to a device under test comprising a MOSFET; and one or more processors configured to execute code that causes the one or more processors to: set a target voltage to be measured across the MOSFET; apply a force voltage to the MOSFET; measure a drain current and a drain voltage of the MOSFET with the one or more probes; determine if a difference between the measured drain voltage and the target voltage meets a threshold; when the difference does not meet the threshold, use the measured drain voltage, the measured drain current, and a load resistance to determine a new force voltage value to compensate for the load resistance, set the force voltage to the new force voltage value, and repeat the apply, measure and determine steps as needed.

Example 2 is the test and measurement instrument of Example 1, wherein the code that causes the one or more processors to determine if the difference meets the threshold causes the one or more processors to determine if the difference is less than an acceptable error.

Example 3 is the test and measurement instrument of either of Examples 1 or 2, the one or more processors being further configured to execute code to cause the one or more processors to determine a new force voltage and repeat the apply, measure, and determine steps, when the difference does meet the threshold.

Example 4 is the test and measurement instrument of any of Examples 1 through 3, the one or more processors being further configured to execute code to cause the one or more processors to use the force voltage for the MOSFET, when the difference does meet the threshold.

Example 5 is the test and measurement instrument of any of Examples 1 through 4, wherein the code that causes the one or more processors to use the measured drain voltage, the measured drain current, and the load resistance to determine a new force voltage value comprises code to cause the one or more processors to: determine the load resistance by finding the result of subtracting the measured drain voltage from the force voltage and dividing the result by the measured drain current; and determine the new force voltage value by adding the product of the load resistance and an expected drain current to the value of the target voltage.

Example 6 is the test and measurement instrument of Example 5, wherein the one or more processors are further configured to execute code that causes the one or more processors to determine the expected drain current by multiplying the measured drain current by the force voltage divided by the drain voltage.

Example 7 is the test and measurement instrument of Example 5, wherein the one or processors are further configured to execute code that causes the one or more processors to determine the expected drain current by measuring the drain voltage and the drain current at least twice to produce a previous measurement and an instant measurement, and then to: calculate an expected drain current by finding a product of the force voltage by a slope of a line between the previous measurement and the instant measurement; and add a y-intercept of the line to the product.

Example 8 is a method, comprising: setting a target voltage to be measured across a device under test comprising a MOSFET; applying a force voltage to the MOSFET; measuring at least one drain current and at least one drain voltage of the MOSFET; determining if a difference between the measured drain voltage and the target voltage meets a threshold; when the difference does not meet the threshold: calculating a load resistance; calculating an expected drain current; using the expected load resistance, the expected drain current and the target voltage find a new voltage value for the force voltage; and repeating the setting, applying, measuring, and determining until the difference meets the threshold.

Example 9 is the method of Example 8, wherein determining if the difference meets a threshold comprises determining if the difference is less than an acceptable error.

Example 10 is the method of either of Examples 8 or 9, wherein calculating the expected drain current comprises multiplying the at least one measured drain current by the force voltage divided by the at least one drain voltage.

Example 11 is the method of any of Examples 8 through 10, wherein measuring at least one drain current and at least one drain voltage comprises measuring two drain currents, a previous drain current and an instant drain current, measuring at least one drain voltage comprises measuring at least two drain voltages, a previous drain voltage and an instant drain voltage.

Example 12 is the method of Example 11, wherein calculating the expected drain current comprises finding a product of the force voltage by a slope of a line between the previous drain current and drain voltage measurements and the instant drain current and drain voltage measurements, and adding a y-intercept of the line to the product.

Example 13 is the method of Example 12, wherein the slope of the line equals dividing the quantity of the previous drain current minus the instant drain current by the quantity of the previous drain voltage minus the instant drain voltage.

Example 14 is the method of Example 12, wherein the y-intercept equals the previous drain current minus the force voltage multiplied by the slope of the line.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although specific examples of the invention have been illustrated and described for purposes of illustration, it will be understood that various modifications may be made without departing from the spirit and scope of the invention. Accordingly, the invention should not be limited except as by the appended claims.

The invention claimed is:

1. A test and measurement instrument, comprising:
a user interface;
one or more probes configured to connect to a device under test comprising a MOSFET; and
one or more processors configured to execute non-transitory code that causes the one or more processors to:
set a target voltage to be measured across the MOSFET;
apply a force voltage to the MOSFET;
measure a drain current and a drain voltage of the MOSFET with the one or more probes;
determine if a difference between the measured drain voltage and the target voltage meets a threshold; and
when the difference does not meet the threshold, use the measured drain voltage, the measured drain current, and a load resistance to determine a new force voltage value to compensate for the load resistance, set the force voltage to the new force voltage value, and repeat the apply, measure and determine steps as needed, wherein the load resistance is coupled to the MOSFET and the load resistance is determined by finding a result of subtracting the measured drain voltage from the force voltage and dividing the result by the measured drain current.

2. The test and measurement instrument as claimed in claim 1, wherein the code that causes the one or more processors to determine if the difference meets the threshold causes the one or more processors to determine if the difference is less than an acceptable error.

3. The test and measurement instrument as claimed in claim 1, the one or more processors being further configured to execute code to cause the one or more processors to determine a new force voltage and repeat the apply, measure, and determine steps, when the difference does meet the threshold.

4. The test and measurement instrument as claimed in claim 1, the one or more processors being further configured to execute code to cause the one or more processors to use the force voltage for the MOSFET, when the difference does meet the threshold.

5. The test and measurement instrument as claimed in claim 1, wherein the code that causes the one or more processors to use the measured drain voltage, the measured drain current, and the load resistance to determine a new force voltage value comprises code to cause the one or more processors to:
determine the new force voltage value by adding a product of the load resistance and an expected drain current to the value of the target voltage.

6. The test and measurement instrument as claimed in claim 5, wherein the one or more processors are further configured to execute code that causes the one or more processors to determine the expected drain current by multiplying the measured drain current by the force voltage divided by the drain voltage.

7. The test and measurement instrument as claimed in claim 5, wherein the one or processors are further configured to execute code that causes the one or more processors to determine the expected drain current by measuring the drain voltage and the drain current at least twice to produce a previous measurement and an instant measurement, and then to:
calculate an expected drain current by finding a product of the force voltage by a slope of a line between the previous measurement and the instant measurement; and
add a y-intercept of the line to the product.

8. A method, comprising:
setting a target voltage to be measured across a device under test comprising a MOSFET;
applying a force voltage to the MOSFET;
measuring at least one drain current and at least one drain voltage of the MOSFET;
determining if a difference between the at least one measured drain voltage and the target voltage meets a threshold;
when the difference does not meet the threshold:
calculating a load resistance;
calculating an expected drain current;
using the load resistance, the expected drain current and the target voltage find a new voltage value for the force voltage, wherein the load resistance is coupled to the MOSFET and the load resistance is determined by finding a result of subtracting the at least one measured drain voltage from the force voltage and dividing the result by the at least one measured drain current; and
repeating the setting, applying, measuring, and determining until the difference meets the threshold.

9. The method as claimed in claim 8, wherein determining if the difference meets a threshold comprises determining if the difference is less than an acceptable error.

10. The method as claimed in claim 8, wherein calculating the expected drain current comprises multiplying the at least one measured drain current by the force voltage divided by the at least one drain voltage.

11. The method as claimed in claim 8, wherein measuring at least one drain current and at least one drain voltage comprises measuring two drain currents, a previous drain current and an instant drain current, measuring at least one drain voltage comprises measuring at least two drain voltages, a previous drain voltage and an instant drain voltage.

12. The method as claimed in claim 11, wherein calculating the expected drain current comprises finding a product of the force voltage by a slope of a line between the previous drain current and drain voltage measurements and the instant drain current and drain voltage measurements, and adding a y-intercept of the line to the product.

13. The method as claimed in claim 12, wherein the slope of the line equals dividing the quantity of the previous drain current minus the instant drain current by the quantity of the previous drain voltage minus the instant drain voltage.

14. The method as claimed in claim 12, wherein the y-intercept equals the previous drain current minus the force voltage multiplied by the slope of the line.

15. A method, comprising:
setting a target voltage to be measured across a device under test comprising a MOSFET;
applying a force voltage to the MOSFET;
measuring at least one drain current and at least one drain voltage of the MOSFET by measuring two drain currents, a previous drain current and an instant drain current, and by measuring at least two drain voltages, a previous drain voltage and an instant drain voltage;
determining if a difference between the at least one measured drain voltage and the target voltage meets a threshold;
when the difference does not meet the threshold:
calculating a load resistance;
calculating an expected drain current;

using the load resistance, the expected drain current and the target voltage find a new voltage value for the force voltage; and repeating the setting, applying, measuring, and determining until the difference meets the threshold.

16. The method as claimed in claim 15, wherein calculating the expected drain current comprises:

finding a product of the force voltage by a slope of a line between the previous drain current and drain voltage measurements and the instant drain current and drain voltage measurements; and adding a y-intercept of the line to the product.

17. The method as claimed in claim 16, wherein the slope of the line equals dividing a quantity of the previous drain current minus the instant drain current by a quantity of the previous drain voltage minus the instant drain voltage.

18. The method as claimed in claim 16, wherein the y-intercept equals the previous drain current minus the force voltage multiplied by the slope of the line.

19. The method as claimed in claim 15, wherein determining if the difference meets a threshold comprises determining if the difference is less than an acceptable error.

20. The method as claimed in claim 15, wherein calculating the expected drain current comprises multiplying the at least one measured drain current by the force voltage divided by the at least one drain voltage.

* * * * *